UNITED STATES PATENT OFFICE.

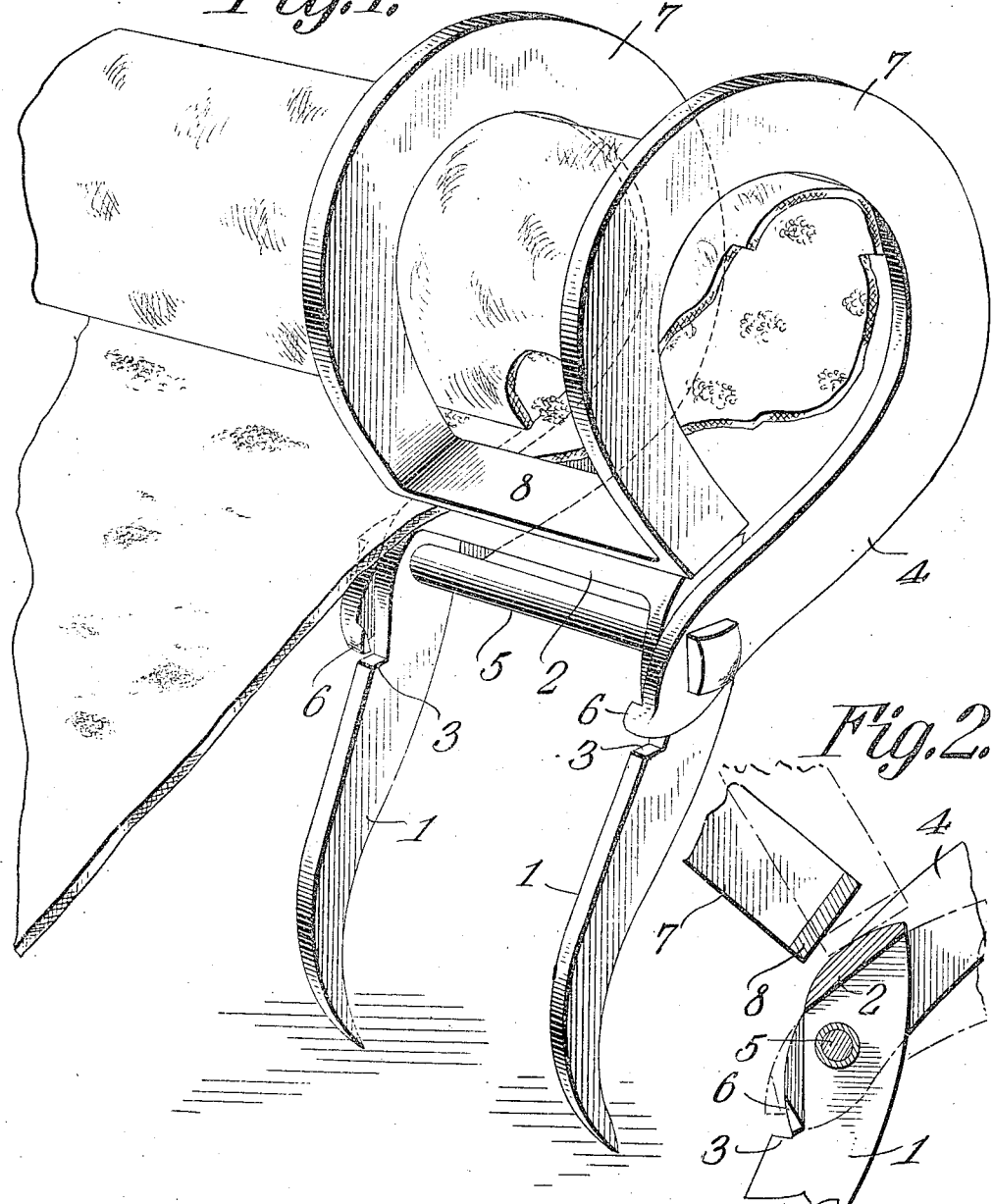

ROY WIGHT GIDDINGS AND WILLIAM F. EMERICK, OF COLORADO SPRINGS, COLORADO.

LINOLEUM AND CARPET STRETCHER.

No. 843,743.     Specification of Letters Patent.     Patented Feb. 12, 1907.

Application filed September 12, 1906. Serial No. 334,316.

*To all whom it may concern:*

Be it known that we, ROY WIGHT GIDDINGS and WILLIAM F. EMERICK, citizens of the United States, residing at Colorado Springs, in the county of El Paso and State of Colorado, have invented a new and useful Linoleum and Carpet Stretcher, of which the following is a specification.

This invention has relation to linoleum and carpet stretchers; and it consists in the novel construction and arrangement of its parts, as hereinafter shown and described.

The object of the invention is to provide an implement adapted to be used for laying and stretching linoleum, carpet, or other floor-covering.

It consists, primarily, of a floor-engaging member to the upper portion of which is pivotally attached a loop member, the said members being so positioned with relation to each other as to form a clamp for gripping the floor-covering when the loop member is swung on its pivot in one direction and for releasing the floor-covering when the loop member is swung on its pivot in the opposite direction. The swinging of the loop member upon its pivot for gripping the floor-covering occurs at the same time that the implement is tilted upon its floor-engaging member while stretching the floor-covering. The loop member is also adapted to retain a roll of the floor-covering, so as to enable the operator to work close to the base-board of the room.

In the accompanying drawings, Figure 1 is a perspective view of the stretcher, and Fig. 2 is a vertical sectional view of the meeting ends of the floor-engaging member and the loop member.

The floor-engaging member consists of the prongs 1 1, which are connected together at their upper ends by the cross-bar 2. The upper outer edges of the said prongs 1 1 are provided with the shoulders 3 3. The loop member 4 is pivotally attached to the outer sides of the prongs 1 1, near their upper ends, by means of the transversely-extending bolt 5, which is located below the cross-bar 2 and spaced from the same. The ends of the loop member 4 are provided with shoulders 6 6, which are adapted to coöperate with the shoulders 3 3 in limiting the movement of the said loop member 4 in one direction with relation to the prongs 1 1. The said member 4 is bent in the form of loops 7 7, the ends of which are connected together by means of the cross-bar 8, which is located above the cross-bar 2. The said cross-bars 2 and 8 constitute a clamp for gripping the floor-covering, and the said covering may be rolled within the loops 7 7 in order that the operator may work close to the base-board of the room in laying the covering.

The operation of the stretcher is as follows: The pointed ends of the prongs 1 1 are engaged with the floor, and the floor-covering is clamped between the cross-bars 2 and 8. The stretcher is then swung down, using the ends of the prongs 1 1 as fulcrum-points, and the covering is stretched. By swinging the loop member 4 back on the pivot 5 the floor-covering is released.

Having described our invention, what we claim, and desire to secure by Letters Patent, is—

1. A stretcher comprising a pronged member having a shoulder, and a loop member pivoted to the prong member and having a shoulder which coöperates with the shoulder of the prong member, said members having adjacent ends which constitute a floor-cover clamp.

2. A stretcher comprising a floor-engaging member having prongs, a cross-bar connecting said prongs together, said prongs having shoulders provided in their edges, a loop member pivoted to the sides of the said prongs and having shoulders which coöperate with the prong-shoulders, said loop member having vertically-disposed loops, and a cross-bar connecting the ends of said loops together, the cross-bar of the floor-engaging member and the cross-bar of the loop member constituting a floor-cover clamp.

In testimony that we claim the foregoing as our own we have hereto affixed our signatures in the presence of two witnesses.

ROY WIGHT GIDDINGS.
    WM. F. EMERICK.

Witnesses:
    E. W. GIDDINGS,
    JAMES W. AVERY.